United States Patent [19]

Yang

[11] Patent Number: 4,851,929

[45] Date of Patent: Jul. 25, 1989

[54] RECORDER/PLAYER DEVICE WITH STATIONARY RECORDING MEDIUM AND CONSTANT SPEED SIGNAL HEAD DRIVE

[76] Inventor: De Q. Yang, 14565 SW. 77th Ct., Miami, Fla. 33158

[21] Appl. No.: 73,194

[22] Filed: Jul. 14, 1987

[51] Int. Cl.⁴ .............................................. G11B 5/48
[52] U.S. Cl. ....................................... 360/2; 360/101; 369/111
[58] Field of Search ..................... 360/2, 101; 369/111

[56] References Cited

U.S. PATENT DOCUMENTS 3,787,636  1/1974  Brandt et al. ........................ 360/101
4,040,097  8/1977  Mizuno ............................... 360/101

Primary Examiner—Alan Faber
Assistant Examiner—Kevin J. Fournier
Attorney, Agent, or Firm—Fleit, Jacobson, Cohn, Price, Holman & Stern

[57] ABSTRACT

Signal heads are displaced relative to a recording surface on a stationary recording medium having a separate surface on which visual data is recorded and displayed. Differential drive mechanism and adjustable resistor means effects signal head displacement along a predetermined path on the recording surface at a constant speed.

23 Claims, 3 Drawing Sheets

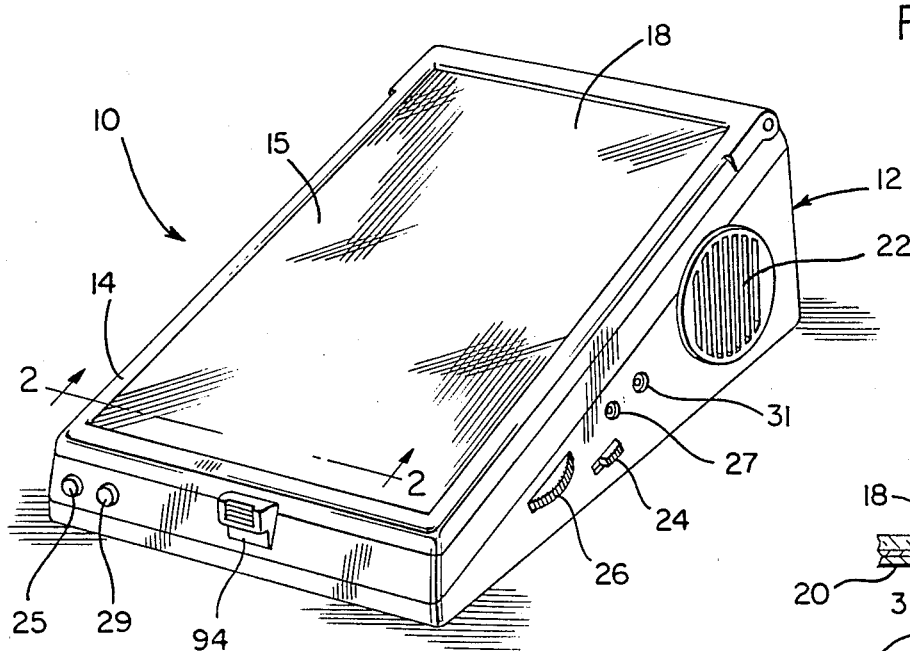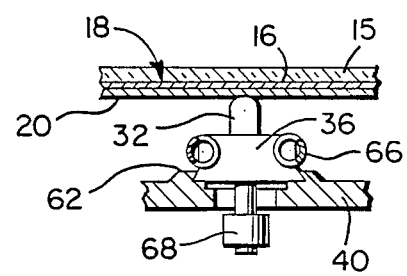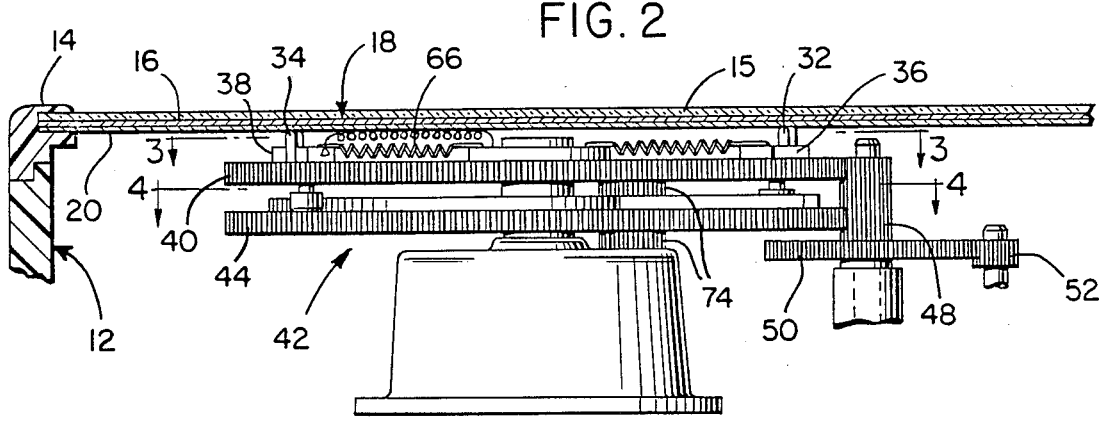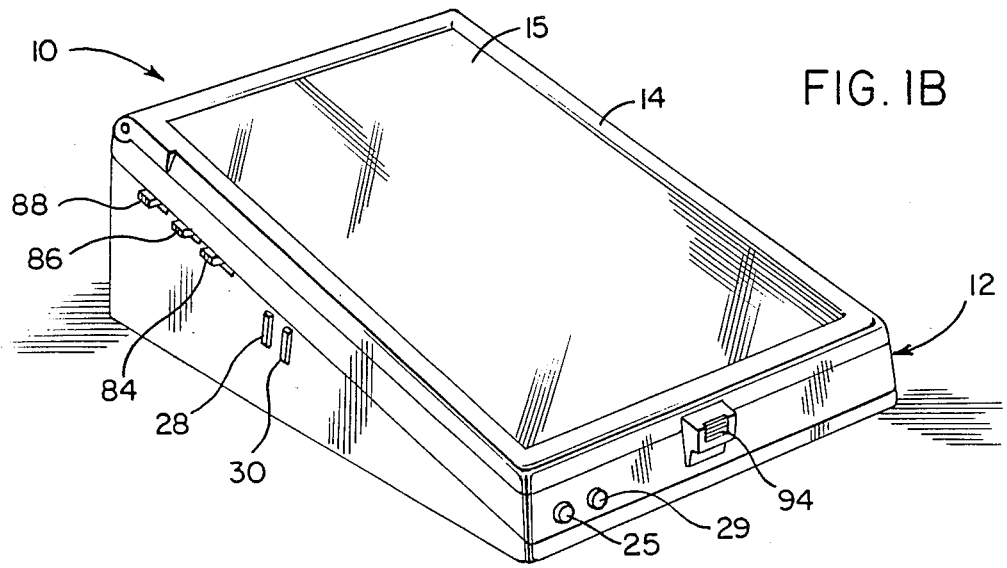

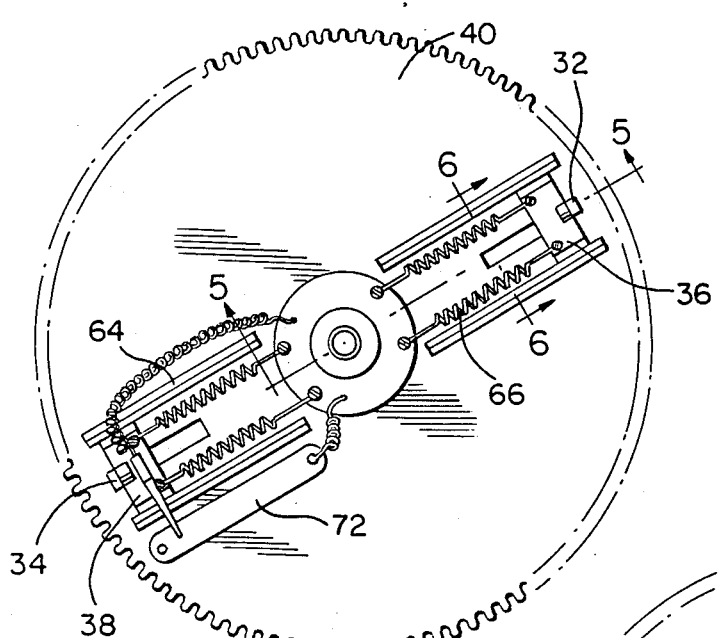
FIG. 3
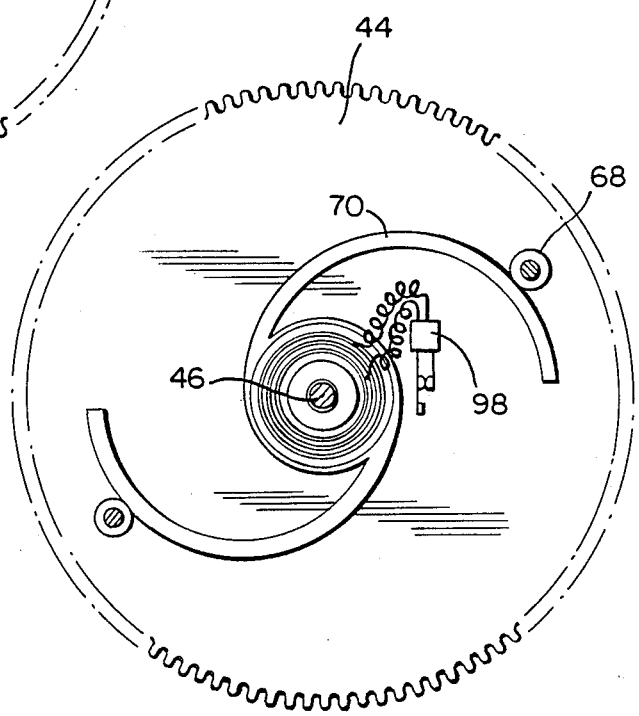
FIG. 4
FIG. 5
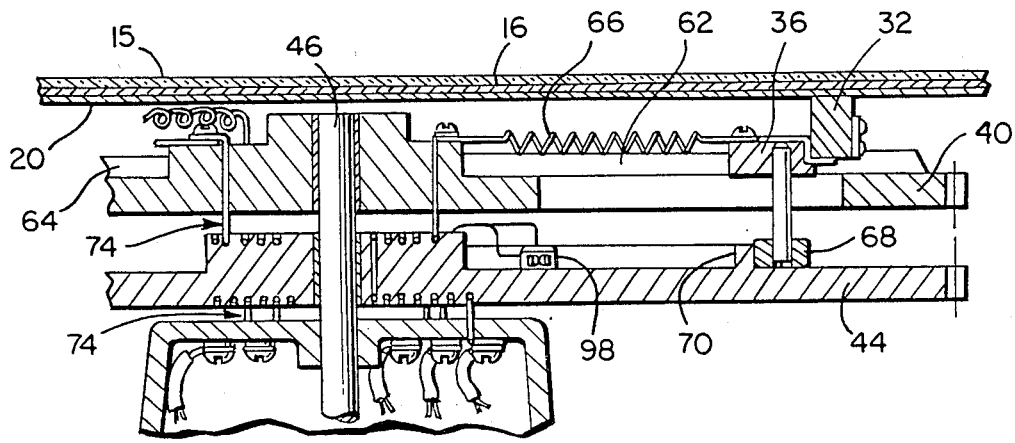

RECORDER/PLAYER DEVICE WITH STATIONARY RECORDING MEDIUM AND CONSTANT SPEED SIGNAL HEAD DRIVE

This invention relates to magnetic recording and playback of audio signals, and in particular to apparatus of such type which also has a visual data display capability.

Various combined information recording and readout devices of varying complexities have been proposed or produced wherein audio signals are recorded and played back in association with the display of visual data. For example, a photograph is attached to one side of a sheet of paper supporting on its other side a magnetic recording surface according to U.S. Pat. No. 3,787,636 to Brandt et al. The sheet of paper also supports a plastic base formed with a spiral grooved track engaged by a follower to guide travel of a signal head along a spiral recording path about a fixed axis established by the base adhesively fixed to the supporting sheet of paper according to the Brandt et al patent. In all of such devices, the visual information cannot be recorded directly on the same recording medium by writing, typing, printing, photocopying, etc. Accordingly, other often costly and complex have been devised to coordinate handling of audio and visual information in such apparatus for both recording and playback or display purposes.

It is therefore an important object of the present invention to provide means for avoiding the drawbacks aforementioned in connection with combined audio and visual information devices of the magnetic recorder/playback type.

A further object in accordance with the foregoing object is to provide a magentic type of audio recording and playback device which has a unique arrangement for accommodating coordinated visual data display.

SUMMARY OF THE INVENTION

In accordance with the present invention, a recording medium such as a sheet of paper has one side surface thereof devoted to the recording of visual data by writing, typing, printing, photocopying, etc., while the other side acts as a substrate for a magnetic recording layer adapted to be operatively positioned in contact with signal heads, including a record/playback head and an erase head. The paper recording medium is maintained stationary within a frame through which its visual data recording surface is exposed for display while its magnetic underside layer is in operative contact with movable signal heads.

The signal heads are displaced during rcording and playback operations by means of a drive mechanism driven by a DC motor connected in series with a speed regulating circuit to an electrical power source. An adjustable resistor in the speed regulating circuit varies the speed of the DC motor as a function of a radial component of motion of the signal heads during displacement thereof along a non-linear spiral path established by the drive mechanism.

In accordance with one embodiment of the invention the motor is drivingly connected to positioning carriages, on which the signal heads are mounted, by a pair of gears of the drive mechanism rotatable about a common rotational axis fixed to the frame. The gears are driven at a differential speed and toward that end are provided with different numbers of teeth in mesh with a common drive pinion. Dovetail grooved guides in one of the gears slidably mount the positioning carriages for radial displacement of the signal heads during rotation under control of spiral cam elements fixed to the other gear in order to establish the spiral path along which each signal head is displaced without any guidance from the recording medium as in the case of the Brandt et al patent aforementioned. The adjustable resistor is mounted on said one of the gears along a dovetail guide for one of the positioning carriages so as to be adjusted in response to the radial movement of such carriage on said one of the gears.

The adjustable resistor forms part of the motor speed regulating circuit through which the motor speed is varied as aforementioned in order to obtain a constant linear speed for the signal heads relative to the stationary magnetic recording surface on the recording medium during travel along the spiral path established independently thereof. Two or more different constant linear speeds may be selected through a motor speed control device to accommodate the recording and playback of different types of audio signals, such as language and music signals.

BRIEF DESCRIPTION OF DRAWING FIGURES

These together with other objects and advantages which will become subsequently apparent reside in the details of construction and operation as more fully hereinafter described and claimed, reference being had to the accompanying drawings forming a part hereof, wherein like numerals refer to like parts throughout.

FIGS. 1A and 1B are perspective views of a magnetic recorder/player device with visual data display attributes in accordance with one embodiment of the invention.

FIG. 2 is a partial section view taken substantially through a plane indicated by section line 2—2 in FIG. 1.

FIGS. 3 and 4 are top section views taken substantially through planes indicated by section lines 3—3 and 4—4 in FIG. 2.

FIGS. 5 and 6 are partial sections taken substantially through planes indicated by section lines 5—5 and 6—6 in FIG. 3.

Figure 7:
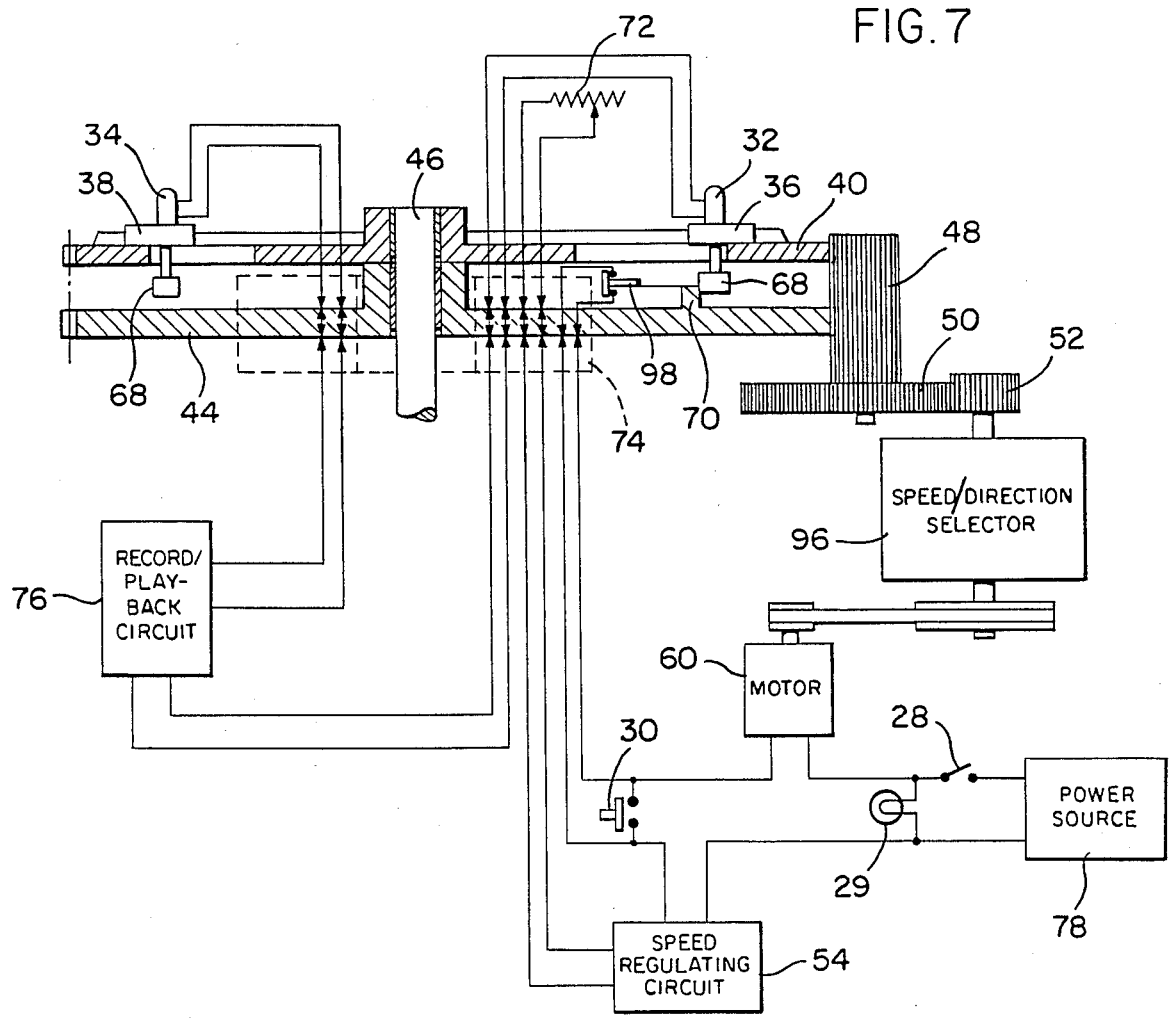

FIG. 7 is a combined circuit diagram and schematic view showing the control system associated with the device shown in FIGS. 1-6.

Figure 8:
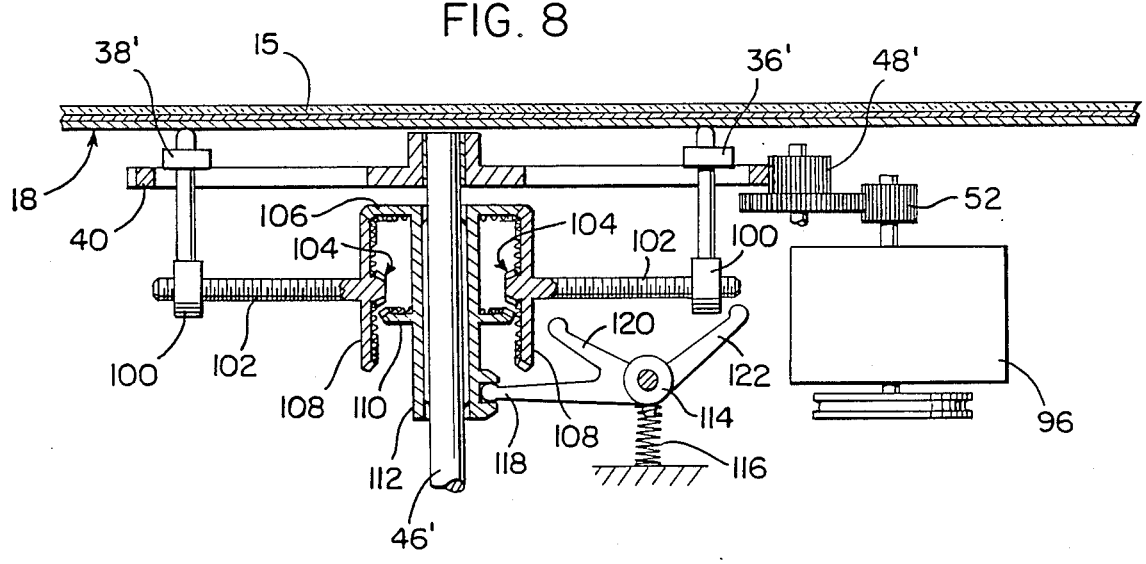

FIG. 8 is a partial section view corresponding to FIG. 2 but showing a modified embodiment.

DETAILED DESCRIPTION OF PREFERRED EMBODIMENT

Referring now to the drawings in detail, FIGS. 1A and 1B illustrate a typical recorder/player apparatus 10 within which the present invention is embodied. The apparatus 10 as shown has a housing 12 on which a frame 14 is mounted. As more clearly seen in FIG. 2, the frame 14 visually exposes through a transparent cover 15, a visual data recording surface 16 of a recording medium 18 in the form of a flexible sheet of material such as paper or plastic film. The underside of the flexible sheet is completely covered by a magnetic layer 20 deposited thereon or a prefabricated magnetic film adhered thereto as shown in FIG. 2, to form a separate audio signal recording surface.

The housing 12 shown in FIGS. 1A and 1B encloses all of the usual electronics to perform various functions usually associated with magnetic recorder/player apparatus. For example, the indication of power switched on by power switch 28 is performed by illumination of an indicator lamp 29, while the starting of recording or playback operations is effected by depressing a start button switch 30. A change in mode between recording and playback operation is performed upon actuation of switch 24. During a recording operation, signal pick-up is provided for through a built-in microphone, while an external microphone may be plugged into a socket 27. Audio output during playback operation is emitted through an opening grill 22 under control of a volume control device 26. An earphone may alternatively be plugged into socket 31 for receiving the audio output. Speed selector switch 84 is provided to accommodate music or language modes. Switch 86 is used to reverse direction of drive while switch 88 is actuated for a high speed search operation.

In accordance with the present invention the recording medium 18 is maintained stationary by the frame 14 during audio recording or playback operations. The recording medium is accordingly held tightly along its periphery under the frame 14 below the transparent cover 15. The frame 14 may be released from its latched condition by button 94, and pivotally raised with cover 15 to enable removal and replacement of the recording medium.

Referring once again to FIG. 2, a portion of the hardware enclosed in housing 12 includes a record/playback signal head 32 having a signal pickup function during playback operation and an audio signal recording function during recorder operation. A second head 34 has an erase function. The signal heads are respectively mounted by positioning carriages 36 and 38 in operative underlying relation to the magnetic signal recording surface 20 of the sheet of material forming the recording medium 18. The positioning carriages 36 and 38 are movably mounted on a turntable in the form of an upper gear wheel member 40 of a motion-converting drive or spiral locus generating mechanism generally referred to be reference numeral 42.

The drive mechanism 42 according to one embodiment includes a lower gear wheel member 44 rotatable relative to the upper gear wheel member 40 about a common fixed rotational axis extending through a bearing shaft section 46. The gear wheel members have a small difference in the number of annular, external gear teeth and mesh with a common drive pinion 48 for simultaneous drive at differential speeds. The drive pinion 48 is connected to a gear 50 in mesh with pinion 52 connected through a speed and direction selector mechanism 96 as diagramed in FIG. 7 to an electric drive motor 60. The gear wheel member 40 is driven at a high reduction drive ratio by the motor 60 through the drive mechanism 42 and selector mechanism 96. In one specific embodiment, the gear wheel members 40 and 44 are respectively provided with 170 and 168 teeth so that they are driven at a corresponding differential speed resulting in a small relative rotational relationship therebetween during operation of the apparatus in response to energization of the motor 60.

As more clearly seen in FIGS. 3, 4, 5 and 6 the signal head positioning carriages 36 and 38 are slidably mounted on the gear wheel member 40, for rotation therewith, by cross-sectionally dovetail grooved guides 62 and 64 disposed in 180° spaced relationship to each other. As more clearly seen in FIG. 3, a pair of coil springs 66 are connected to each positioning carriage and are anchored to the gear in order to bias the carriage radially inward and act as signal current conductors to the signal heads. Cam follower rollers 68 connected to the carriages below the gear wheel 40 are thereby held in contact engagement with a pair of spiral cam elements 70 connected to the lower gear wheel 44 for rotation therewith as more clearly seen in FIG. 4. In view of the relative rotational movement of the gear wheels at differential speeds, each of the carriages will be cyclically displaced radially outward by the cam elements 70 and returned to radially inner positions under the bias of springs 66 during continuous rotation of the gear wheels by the motor 60. When the cam followers 68 return to their radially inner positions at the end of an operational cycle, switch 98 is actuated to stop the motor by cut off of power therefrom. The motor may then be restarted by actuation of start button switch 30. The signal heads 32 and 34 will thereby be displaced along spiral paths relative to the stationary recording medium 18 during each operational cycle.

Inasmuch as the linear speed of each signal head during travel along the spiral path will be a function of its angular speed and radial distance from the rotational axis, the rotational speed of the motor is varied in order to maintain a constant linear travel speed for the signal heads for proper signal recording and playback operations. An adjustable resistor 72 of a carbon film type, for example, is mounted on the gear wheel 40 along guide 64 adjacent the erase head 34 more clearly seen in FIG. 3, for adjustment by radial movement of positioning carriage 38. Accordingly, the resistance value of resistor 72 is varied in response to the radial component of travel along the spiral path of the signal head in order to compensate for the affect of the variation in radial distance, as aforementioned, to obtain a constant linear travel speed. The resistor 72 is electrically connected by conductors to the speed regulating circuit 54 through a connector device 74 as diagrammed in FIGS. 2 and 5, through which conductors from the signal heads 32 and 34 are also electrically coupled to recording and playback circuit 76.

With reference to FIG. 7, the speed regulating circuit is shown connected in series with adjustable resistor 72 through connector device 74 to the motor 60 and an electrical source of power 78 in order to vary its output speed and achieve a constant linear travel speed of the signal heads along their spiral paths. The selector mechanism 96, of any well-known type, is interconnected between the motor 60 and the power source in order to select the magnitude of the constant linear speed or change the direction of rotation of the signal heads under control of switches 84, 86 and 88 as aforementioned. According to one specific embodiment, either a lower constant linear speed of 1.6 cm/sec. for the signal heads may be selected through switch 84 to record language signals for a duration of 16 minutes or a higher constant linear speed of 4.8 cm/sec. may be selected for a duration of 5 minutes to record music on a 8½"×11" sheet of recording medium.

FIG. 8 illustrates an alternative embodiment having a modified drive mechanism 42' wherein the lower gear 44 of drive mechanism 42 is replaced together with the spiral cams mounted thereon. The signal head carrying turntable or upper gear 40 alone is rotated through a pinion 48' to impart rotation to signal head carriages 36' and 38' slidably mounted on the gear 40 as in the case of mechanism 42 hereinbefore described with respect to FIGS. 2, 3 and 5. The carriages 36' and 38' are however connected to a pair of internally threaded screw nuts 100, below the gear 40, which threadedly receive therethrough a pair of radially extending lead screws 102. The lead screws are connected at their radially inner ends to compound planet gear assemblies having small diameter bevel gears 104 and large diameter bevel gears 108. A non-rotatable sleeve 112 is splined to fixed shaft 46' on which the gear 40 is rotatable. A pair of reaction bevel gears 106 and 110 are fixed to sleeve 112 in axially spaced relation to each other for alternatively meshing with the planet bevel gears 104 and 108 by axial displacement of sleeve 112. At its lower end, the sleeve 112 is engaged by one arm 118 of a control lever 114, having another pair of actuator arms 120 and 122 angularly spaced from each other. The lever 114 is mounted for angular displacement about a fixed axis between two operative positions in which it is yieldably held by a spring 116.

In the position of control lever 114 shown in FIG. 8, the sleeve 112 is in it lower position holding reaction bevel gear 106 in mesh with the planet bevel gears 108. Accordingly, as the bevel gears 108 are rotated about the axis of shaft 46' by gear 40 through the carriages 36 and 38 and the lead screws 102, the bevel gears 108 will rotate about their own axes extending through the lead screws. The lead screws will therefore be rotated by the bevel gears 108 at a relatively low speed causing the nuts 100 to be axially displaced therealong in a radially outward direction. The carriages 36 and 38 will hence be displaced radially outward by the nuts 100 as they are rotated by gear 40 in order to move the signal heads along a spiral path during a recording or playback operation.

When the screw nuts 100 reach a radially outer limit position, they engage the arm 122 of the control lever 114 displacing it in a clockwise direction as viewed in FIG. 8 to cause the arm 118 to displace sleeve upwardly to its upper position. In the upper position of sleeve 112, bevel gear 110 meshes with the smaller planet gears 104 while bevel gears 106 and 108 disengage. The lead screws will therefore be rotated in a reversed direction at a higher speed causing the nuts 100 to move radially inward from their radially outer limit positions. The carriages 36' and 38' will accordingly be displaced radially inward at a higher speed during rotation of gear 40 so as to move the signal heads more rapidly.

The foregoing is considered as illustrative only of the principles of the invention. Further, since numerous modifications and changes will readily occur to those skilled in the art, it is not desired to limit the invention to the exact construction and operation shown and described and accordingly, all suitable modifications and equivalents may be resorted to, falling within the scope of the invention.

What is claimed is:

1. In a recorder/player apparatus utilizing a recording medium on which audio signals are recorded, at least one signal head, means for positioning the signal head in operative relation to the recording medium, a motor, drive means operatively connecting the motor to the signal head for establishing a non-linear path of travel thereof relative to the recording medium during operation of the apparatus, and frame means for maintaining the recording medium stationary during said operation, said drive means including motion converting means drivingly connecting the motor to the positioning means for displacement of the signal head independently of the recording medium along said non-linear travel path and speed regulating means operatively connected to the positioning means and the motor for limiting said displacement of the signal head to a constant speed along said non-linear path of travel relative to the stationary recording medium.

2. The apparatus as defined in claim 1, wherein said motion converting means includes a rotatable member driven by the motor about a rotational axis, guide means mounted on the rotatable member for guiding movement of the positioning means relative to said axis independently of the recording medium, a cam operatively engageable with the positioning means and gear means drivingly connecting the motor to the rotatable member and the cam for rotation thereof about said axis at a differential speed to effect said displacement of the signal head along the non-linear path.

3. In a recorder/player apparatus utilizing a recording medium on which audio signals are recorded, at least one signal head, means for positioning the signal head in operative relation to the recording medium, a motor, drive means operatively connected to the motor for imparting relative movement between the recording medium and the signal head during operation of the apparatus, and frame means for maintaining the recording medium stationary during said operation, said drive means including motion converting means drivingly connecting the motor to the positioning means for displacement of the signal head along a predetermined path to impart said relative movement thereto and speed regulating means operatively connected to the positioning means and the motor for limiting said displacement of the signal head to a constant speed along said path relative to the stationary recording medium, said motion converting means including a rotatable member driven by the motor about a rotational axis, guide means mounted on the rotatable member for guiding movement of the positioning means radially on the rotatable member relative to said axis, a cam operatively engageable with the positioning means and gear means drivingly connecting the motor to the rotatable member and the cam for rotation thereof about said axis at a differential speed to effect said displacement of the signal head along the predetermined path, said gear means comprising a pair of driven gears having different numbers or teeth respectively connected to the rotatable member and the cam and a pinion gear driven by the motor in mesh with said pair of driven gears.

4. The apparatus as defined in claim 3 wherein said speed regulating means includes an adjustable resistor electrically connected to the motor and adjusting means responsive to said guided radial movement of the positioning means on the rotatable member for varying the resistor in resistance as a function of the radial displacement of the signal head relative to the rotational axis of the rotatable member.

5. The apparatus as defined in claim 4 wherein the recording medium includes separate recording surfaces on which the audio signals and visual data are respectively recorded.

6. The apparatus as defined in claim 5 wherein the visual data recording surface is visually exposed by the frame means while the audio signal recording surface is disposed in said operative relationship to the signal head.

7. The apparatus as defined in claim 6 including an erase head mounted by the positioning means on the rotatoble member in 180° relation to the first mentioned signal head relative to the rotational axis, said adjusting means being connected to the positioning means.

8. The apparatus as defined by claim 7 wherein said positioning means comprises a pair of radially displaceable carriages on which the signal head and the erase head are respectively mounted.

9. In a recorder/player apparatus utilizing a recording medium on which audio signals are recorded, at least one signal head, means for positioning the signal head in operative relation to the recording medium, a motor, drive means operatively connected to the motor for imparting relative movement between the recording medium and the signal head during operation of the apparatus, and frame means for maintaining the recording medium stationary during said operation, said drive means including motion converting means drivingly conecting the motor to the positioning means for displacement of the signal head along a predetermined path to impart said relative movement thereto and speed regulating means operatively connected to the positioning means and the motor for limiting said displacement of the signal head to a constant speed along said path relative to the stationary recording medium, said motion cinverting means including a rotatable member driven by the motor about a rotational axis, guide means mounted on the rotatable member for guiding movement of the positioning means radially on the rotatable member relative-to said axis, a cam operatively engageable with the positioning means and gear means drivingly connecting the motor to the rotatable member and the cam for rotation thereof about said axis at a differential speed to effect said displacement of the signal head along the predetermined path, said speed regulating means including an adjustable resistor electrically connected to the motor and means responsive to said guided radial movement of the positioning means on the rotatable member for adjusting the resistor in resistance as a function of the radial displacement of the siganl head relative to the rotational axis of the rotatable member.

10. The apparatus as defined in claim 9 including a erase head mounted by the positioning means on the rotatable member in 180° relation to the first mentioned signal head relative to the rotational axis, said adjusting means being connected to the positioning means.

11. The apparatus as defined in claim 10 wherein said positioning means comprises a pair of radially displaceable carriages on which the signal head and the erase head are respectively mounted.

12. The apparatus as defined in claim 1 wherein the recording medium is a flesible sheet of material, one side of which forms the visual data recording surface and the opposite side completely covered by a magnetic layer forming the audio signal recording surface.

13. In a recorder/player apparatus utilizing a recording medium on which audio signals are recorded, at least one signal head, means for positioning the signal head in operative relation to the recording medium, drive means operatively connected to the positioning means for imparting relative movement between the recording medium and the signal head during operation of the apparatus, and frame means for maintaining the recording medium stationary during said operation, said drive means including a source of electrical power, a motor connected to said source, gear means drivingly connecting the motor to the positioning means for displacement of the signal head along a predetermined path to impart said relative movement thereto and speed regulating means operatively connected to the positioning means and the motor for limiting said displacement of the signal head to a constant speed along said path relative to the stationary recording medium, said speed regulating means including an adjustable resistor electrically connected in series with the motor to the source and adjusting means responsive to radial movement of the signal head during said displacement thereof along the predetermined path for varying the resistor in resistance.

14. The apparatus as defined in claim 13 wherein said gear means comprises a pair of gears driven by the motor at differential speeds about a common rotational axis, guide means mounting the positioning means on one of the gears for guided radial movement thereon relative to said rotational axis and cam means mounted on the other of the gears in operative engagement with the positioning means for displacement thereof on said one of the gears corresponding to said displacement of the signal head relative to the stationary recording medium, the predetermined path along which the signal head is displaced having a spiral configuration and said constant speed of the signal head being linear along the path.

15. In a recorder/player apparatus utilizing a recording medium on which audio signals are recorded, at least one signal head, means for positioning the signal head in operative relation to the recording medium, drive means operatively connected to the positioning means for imparting relative movement between the recording medium and the signal head during operation of the apparatus, and frame means for maintaining the recording medium stationary during said operation, said drive means including a source of electrical power, a motor connected to said source, gear means drivingly connecting the motor to the positioning means for displacement of the signal head along a predetermined path to impart said relative movement thereto and speed regulating means operatively cinnected to the positioning means and the motor for limiting said displacement of the signal head to a constant speed along said path relative to the stationary recording medium, said gear means comprising a pair of gears driven by the motor at differential speeds and guide means on one of the gears mounting the positioning means for effecting said displacement of the signal head.

16. The apparatus as defined in claim 15 including a spiral cam element connected to the other of the gears and a follower element connected to the positioning means in engagement with the spiral cam element.

17. In a recorder/player apparatus utilizing a recording medium on which audio signals are recorded, at least one signal head, means for positioning the signal head in operative relation to the recording medium, drive means operatively connected to the positioning means for imparting relative movement between the recording medium and the signal head during iperation of the apparatus, and frame means for maintaining the recording medium stationary during said operation, said drive means including a source of electrical power, a motor connected to said source, gear means drivingly connecting the motor to the positioning means for displacement of the signal head along a predetermined path to impart said relative movement thereto and speed regulating means operatively connected to the positioning menas and the motor for limiting said displacement of the signal head to a constant speed along said path relative to the stationary recording medium, said gear means comprising a gear driven by the motor, means mounting the positioning on the gear for guiding radial movement thereon and means responsive to rotation of the gear by the motor for imparting said radial movement to the positioning means relative to the gear.

18. The apparatus as defined in claim 17 wherein said rotation responsive means is a planetary gear assembly.

19. A magnetic sound recording and reparoducing system comprising: a recording member incorporating a magnetic recording surface; housing means for receiving and retaining said recording member in s stationary position; a magnetic recording and playback head retained in engagement with said recording surface by the housing means; carriage means rotatable about a given axis and movable radially with respect thereto for supporting said recording and playback head; and follower means connected to said carriage means for governing said radial movement thereof; the improvement residing in guide means operatively engaged with the follower means for effecting travel of the recording and playback head independently of the recording member along a spiral path relative to the recording surface in response to said rotation of the carriage means.

20. A magnetic sound recording and reproducing system comprising: a recording member incorporating a magnetic recording surface; housing means for receiving and retaining said recording member in a stationary position; a magnetic recording and playback head retained in engagement with said recording surface by the hosing means; carriage means rotatable about a given axis and movable radially with respect thereto for supporting said recording and playback head; and follower means connected to said carriage means for governing said radial movement thereof; the improvement residing in guide means operatively engaged with the follower means for effecting travel of the recording and playback head inependently of the recording member along a spiral path relative to the recording surface in response to said rotation of the carriage means, comprising a flexible sheet of paper, one side of which is completely covered by said magnetic recording surface.

21. A magnetic sound recording and reproducing system comprising: a recording member incorporating a magnetic recording surface; housing means for receiving and retaining said recording member in a stationary position; a magnetic recording and playback head retained in engagement with said recording surface by the housing means; carriage means rotatable about a given axis and movable radially with respect thereto for supporting said recording and playback head; and follower means connected to said carriage means for governing said radial movement thereof; the improvement residing in guide means operatively engaged with the follower means for effecting travel of the recording and playback head independently of the recording member along a spiral path relative to the recording surface in response to said rotation of the carriage means, said guide means comprising cam means rotatable about said given axis relative to the carriage means and in engagement with the follower means for controlling the radial movement governed by the follower means to establish said spiral path.

22. A magnetic sound recording and reproducing system comprising: a recording member incorporating a magnetic recording surface; housing means for receiving and retaining said recording member in a stationary position; a magnetic recording and playback head retained in engagement with said recording surface by the housing means; carriage means rotatable about a given axis and movable radially with respect thereto supporting said recording and playback head; and follower means cinnected to said carriage means for governing said radial movement thereof; the improvement residing in guide means operatively engaged with the follower means for effecting travel of the recording and playback head independently of the recording member along a spiral path relative to the recording surface in response to said rotation of the carriage means, said guide means comprising planetary gear means operatively connected to the carriage means and the follower means for controlling said governed radial movement to establish said spiral path.

23. The improvement as defined in claim 19 including motor means for imparting said rotation to the carriage means about the given axis at a variable speed and speed regulating means operatively connected to the motor means for adjusting the variable speed of rotation of the carriage means to establish said travel of the recording and playback head independently of the recording medium along the spiral path at a constant linear speed.

* * * * *